United States Patent [19]

Gibson

[11] Patent Number: 4,682,117
[45] Date of Patent: Jul. 21, 1987

[54] QUADRATURE DEMODULATION DATA RECEIVER WITH PHASE ERROR CORRECTION

[75] Inventor: Rodney W. Gibson, Burgess Hill, England

[73] Assignee: U.S. Philips Corporation, New York, N.Y.

[21] Appl. No.: 858,849

[22] Filed: Apr. 30, 1986

Related U.S. Application Data

[63] Continuation of Ser. No. 662,861, Oct. 19, 1984, abandoned.

[30] Foreign Application Priority Data

Oct. 21, 1983 [GB] United Kingdom ............... 8328162

[51] Int. Cl.[4] .............................................. H03D 3/00
[52] U.S. Cl. ..................................... 329/50; 329/124; 375/80; 455/214
[58] Field of Search ......................... 329/50, 122, 124; 375/80, 81, 94, 120; 455/214, 260, 264, 265

[56] References Cited

U.S. PATENT DOCUMENTS

| | | | |
|---|---|---|---|
| 3,971,996 | 7/1976 | Motley et al. | 328/155 |
| 4,054,838 | 10/1977 | Tretter | 375/120 X |
| 4,359,692 | 11/1982 | Ryan | 329/50 |
| 4,521,892 | 6/1985 | Vance et al. | 329/124 X |
| 4,570,125 | 2/1986 | Gibson | 329/50 |

FOREIGN PATENT DOCUMENTS 2502680 7/1976 Fed. Rep. of Germany .
1529284 10/1978 United Kingdom .

*Primary Examiner*—Siegfried H. Grimm
*Attorney, Agent, or Firm*—David R. Treacy

[57] ABSTRACT

A data receiver in which the phase of the carrier signal is controlled so that the threshold levels used for coherent demodulation occur at the quarter points, that is 0°, 90°, 180° and 270°. An input signal is mixed with a local oscillator signal in a pair of mixers and the outputs therefrom are low pass filtered and subsequently demodulated. Any phase errors between the local oscillator signal and the input carrier signal are corrected by a correction loop. The carrier phase error is corrected after (or downstream of) the low pass filters, so that the phase can be corrected rapidly without the risk of instability.

6 Claims, 3 Drawing Figures

QUADRATURE DEMODULATION DATA RECEIVER WITH PHASE ERROR CORRECTION

This is a continuation of application Ser. No. 662,861, filed Oct. 19, 1984, now abandoned.

BACKGROUND OF THE INVENTION

The present invention relates to a data receiver.

European Patent Specification Publication No. 0 098 649, to which U.S. Pat. No. 4,570,125 corresponds, discloses a coherent data demodulator for digital signals wherein correction signals for clock and carrier oscillators are derived by comparing the times of the zero crossings at the outputs of two orthogonal channels with the nominal times at which these crossings should occur. In the case of correcting the phase of the carrier signals, a correction signal is fed back to the local oscillator so that its frequency is adjusted in the desired manner. Although the demodulator disclosed in EP Specification No. 0 098 649 and corresponding U.S. Pat. No. 4,570,125 operates satisfactorily, it does not have a limitation which is concerned with the rate at which the carrier phase can be adjusted. The carrier control loop includes quadrature mixers and low pass filters which have an inherent filter delay. If the carrier phase is adjusted quickly compared to the filter delay then the carrier control loop will go unstable. In some applications it is important for the receiver to have fast acquisition.

SUMMARY OF THE INVENTION

An object of the present invention is to obtain fast acquisition in a coherent data demodulator.

According to the present invention there is provided a data receiver including quadrature mixers having outputs coupled by signal paths to a coherent data demodulator, wherein correction of carrier phase errors is effected after the outputs from the mixers have been pass filtered.

In the data receiver made in accordance with the present invention, the signal phase can be adjusted downstream of the mixers and filters, with negligible loop delay and hence without the risk of instability which would occur if the phase of the local oscillator was adjusted too quickly.

In an embodiment of the present invention, phase shifting networks are provided in the signal paths to the data demodulator which includes means for determining the phase error in the carrier signal and producing a control signal in response to the phase error determined, which control signal is used to determine a phase correction to be applied by said phase shifting networks.

If desired, each phase shifting network has a plurality of parallel outputs and means are provided for selecting one of the outputs in response to the control signal and thereby altering the phase of the signal being applied to the data demodulator. An advantage of using phase shifting networks having parallel outputs over networks having serially arranged outputs is that the networks can be designed to produce a substantially constant time delay irrespective of the phase shift selected.

In another embodiment of the present invention in which the data demodulator includes means for determining the phase error in the carrier signal and producing a control signal in response to the phase error determined, a sine/cosine generator is provided, the generator having an input coupled to receive the control signal and first, second and third outputs on which are produced respectively the sine, cosine and minus sine of the phase correction angle. First and second multipliers are coupled to the output of the first mixer and third and fourth multipliers are coupled to the output of the second mixer. The first generator output is coupled to the second multiplier, the second generator output is coupled to the first and fourth multipliers and the third generator output is coupled to the third multiplier. Additionally first and second summing means are provided. Inputs of the first summing means are coupled respectively to the outputs of the first and third multipliers and inputs of the second summing means are coupled respectively to the inputs of the second and fourth multipliers. The outputs of the first and second summing means are coupled to the data demodulator.

In a further embodiment of the present invention in which the data demodulator includes means for determining the phase error in the carrier signal and producing a control signal in response to the phase error determined, a controllable frequency generator having an output frequency corresponding to substantially one quarter of the received bit rate is provided and has an input for receiving the control signal. First and second quadrature multipliers are provided, the first multiplier being coupled to the output of the first mixer and the second multiplier being coupled to the output of the second mixer, an output of the controllable frequency generator being coupled to the first and second multipliers. Summing means are provided, the summing means having first and second inputs coupled respectively to outputs of the first and second multipliers.

By feeding a frequency of one quarter of the bit rate into the multipliers, the phase of the summed output is rotated by 90° every bit period. Consequently one has a built-in demultiplexer.

BRIEF DESCRIPTION OF THE DRAWINGS

The present invention will now be described, by way of example, with reference to the accompanying drawings, wherein.

DETAILED DESCRIPTION OF THE PREFERRED EMBODIMENTS

Figure 1:
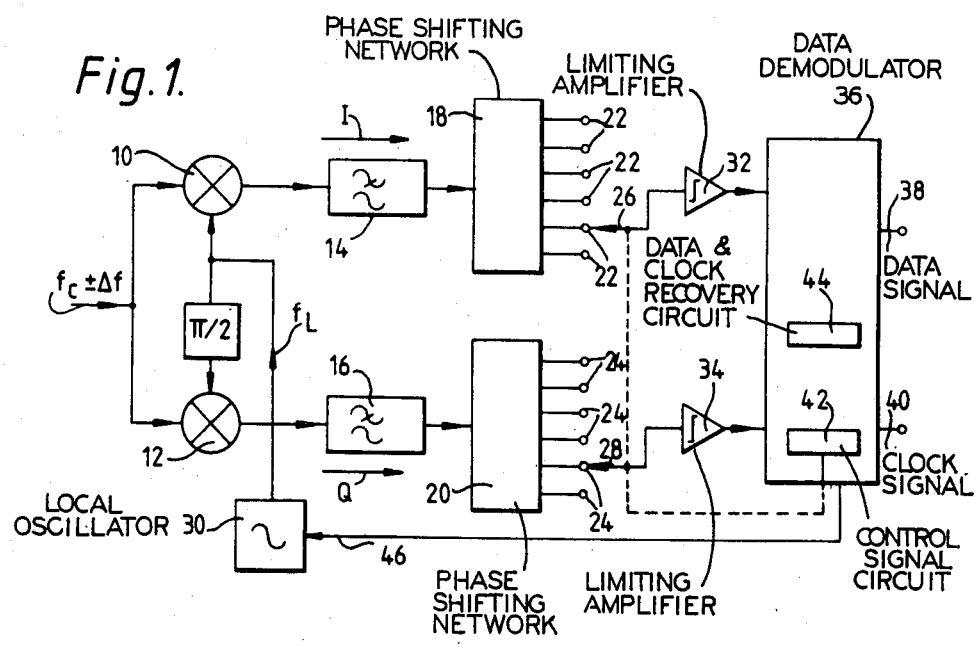
FIG. 1 is a block schematic circuit of an embodiment of a data receiver made in accordance with the present invention.

Referring to FIG. 1, a signal, which may be a frequency modulated, differentially encoded input signal $f_c \pm \Delta f$, is applied to quadrature mixers 10, 12 to which a frequency $f_L$, substantially equal to carrier frequency $f_c$, is applied from a local oscillator 30. The outputs of the mixers 10, 12 are filtered in low pass filters 14, 16 which will pass the modulation frequency $\Delta f$. In an alternative arrangement, not shown, the low pass filters 14, 16 may be omitted and the low pass filtering is done in the mixers 10, 12. Thus in the in-phase channel I the signal is $+\Delta f$ or $-\Delta f$ and in the quadrature channel Q the signal is $+\Delta f - \pi/2$ or $-\Delta f - \pi/2$. By the way of example, $f_c$ may be 900 MHz and the deviation frequency Δf would be a quarter of the bit rate, e.g. for a bit rate of 16 Kb/s Δf is 4 kHz.

In order to control the phase of the signals in the I and Q channels, the outputs of the filters 14, 16 are applied to phase shifting networks 18, 20 which have a plurality of parallel outputs 22, 24. The selection of a particular output 22, 24 is determined in accordance with the phase error in the local oscillator 30 output. As indicated, output selecting devices 26, 28 are ganged together so that the same phase shift is applied to both the I and Q channels. The signals on the devices 26, 28 are hard limited in limiting amplifiers 32, 34 and thereafter the signals are applied to a data demodulator 36 which includes means 44 for recovering the data and the clock signals which are provided on outputs 38, 40 and means 42 for providing a carrier control signal which is applied to the output selecting devices 26, 28.

In the method described for fast acquisitions, it is necessary that the phase of the quadrature signals fed to the limiting amplifiers 32, 34 be pulled quickly into phase lock; otherwise data will be lost.

In the circuit in accordance with the present invention, the phase of the carrier and clock signals is determined from the information contained in the times of the zero crossings at the hard limited outputs of the amplifiers 32, 24. Demodulator arrangements for doing this are described in EP Patent Specification No. 0 098 649, and corresponding U.S. Pat. No. 4,570,125 details of which arrangements are incorporated by way of reference. A description of these arrangements will, in the interests of brevity, not be given herein as they are not relevant to the understanding of the present invention.

In the demodulator arrangements disclosed in EP Patent Specification No. 0 098 649, and corresponding U.S. Pat. No. 4,570,125 the carrier phase correction signal is fed back to the local oscillator to correct its output. In consequence, as low pass filters are part of the correction loop, they impose a time limit on the rate at which the phase can be corrected, which time limit is undesirable if the data receiver is used to recover short burst data.

In the embodiment shown in FIG. 1, by arranging phase shifting networks 18, 20 downstream of the low pass filters 14, 16, the rate of phase correction is not limited by filters 14, 16.

In implementing the phase shifting networks 18, 20, it is preferred that the outputs 22, 24 be arranged in parallel because the time delay of the networks 18, 20 can be substantially constant irrespective of the applied phase shift. The phase shifting networks may be of any suitable type, for example transformers and networks of the Dome type. Although each network has been illustrated as comprising 6 outputs 22, 24, in reality there might be say 8 to 16 equally spaced outputs to provide 45° or 22½° of phase shift within an overall range of 360°. The output selecting devices 26, 28 comprise switches which are operated in response to the carrier control signal from the means 42 in the data demodulator 36, to select the appropriate phase output.

In a non-illustrated alternative embodiment, the phase shifting networks 18, 20 may be of a series type; but a disadvantage of such an arrangement is that the time delay will vary in accordance with the amount of delay required.

It is not essential for automatic frequency control (AFC) to be applied to the local oscillator 30. However if it is found that the frequency stability of the local oscillator 30 is not good enough, then a slow AFC can be applied via an input 46 from an output of the data demodulator 36.

Figure 2:
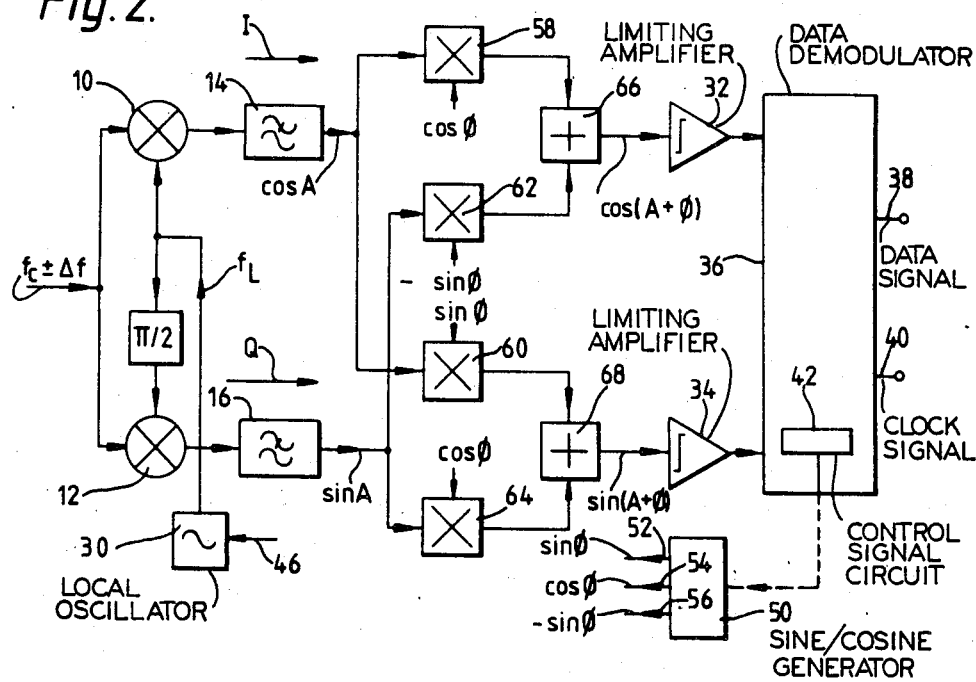
FIG. 2 is a block schematic circuit diagram of another embodiment of a data receiver made in accordance with the present invention.

FIG. 2 illustrates another embodiment of the invention in which the phase of the signal is corrected downstream of the low pass filters 14, 16. In the interests of brevity only the features of difference between FIGS. 1 and 2 will be described. The output from means 42 providing the carrier control signal is coupled to a sine/cosine generator 50 which produces sine, cosine and minus sine of the desired phase angle $\phi$ for correcting the error in the carrier signal on outputs 52,54,56.

Multipliers 58, 60 are coupled to the output of the low pass filter 14 on which the signal cos A is present, and multipliers 62, 64 are coupled to the output of the low pass filter 16 on which the signal sin A is present. The outputs of the multipliers 58, 62 are coupled to a summing circuit 66 whose output is coupled to the limiting amplifier 32. Similarly, the outputs of the multipliers 60, 64 are coupled to the summing circuit 68 whose output is coupled to the limiting amplifier 34. The output 52 of the sine/cosine generator 50 is connected to the multiplier 60, the output 54 is applied to the multipliers 58, 64 and the output 56 is applied to the multiplier 62. Thus the inputs to the summing circuit 66 are:

Cos A cos $\phi$ and $-$sin A sin $\phi$ which combine to form the output cos $(A+\phi)$; the inputs to the summing circuit 68 are:

Cos A sin $\phi$ and sin A cos $\phi$ which combine to form the output sin $(A+\phi)$.

These signals are then demodulated in the data demodulator 36.

In implementing the circuit shown in FIG. 2 the sine/cosine generator 50 can be either an analogue function generator or, particularly if a digital output is produced by the means 42, a digital function generator formed by a register, a ROM and digital-to-analogue converters.

Figure 3:
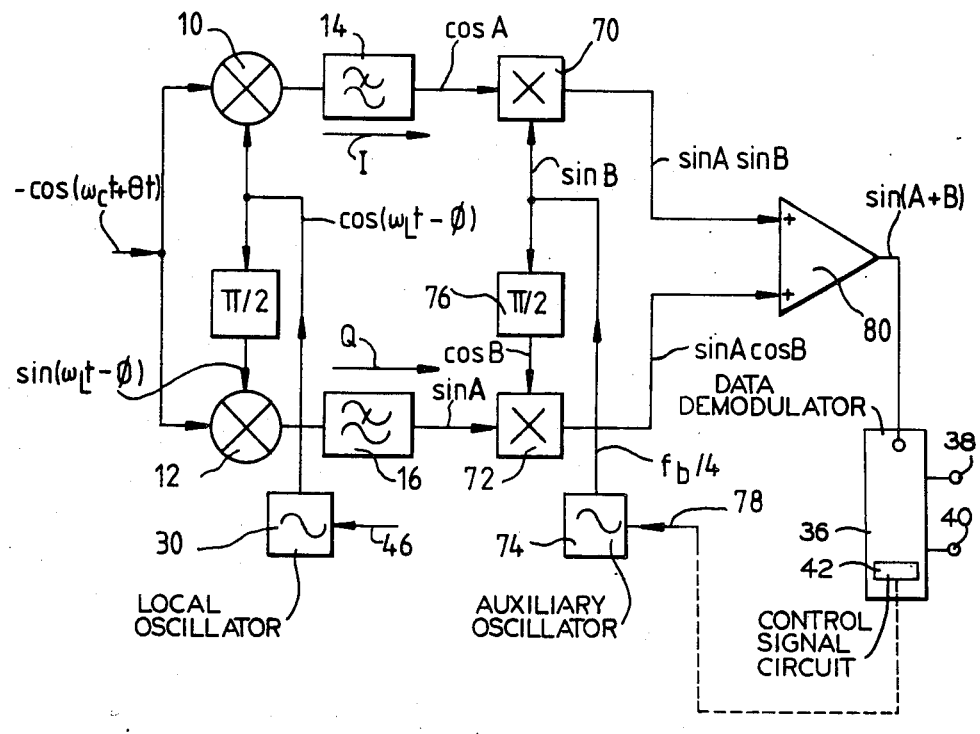
FIG. 3 is a block schematic circuit diagram of a further embodiment of a data receiver made in accordance with the present invention.

FIG. 3 illustrates a further embodiment of the present invention wherein the carrier phase is adjusted downstream of the low pass filters 14, 16. The outputs from these filters comprise cos A and sin A, respectively, where $A=(\omega_C-\omega_L)t+\phi+\theta t$ and $\theta t$ is the modulation. These outputs are applied to multipliers 70, 72 to which the output of an auxiliary oscillator 74 is connected; in the case of the multiplier 72, the auxilary oscillator output is shifted in phase by $\pi/2$ in a phase shifter 76. The frequency of the auxiliary oscillator 74 is nominally $f_b/4$ which corresponds to a quarter of the bit frequency $f_b$. However, the frequency and phase of this signal is adjusted in response to a carrier control signal applied to the auxiliary oscillator on an input 78. In FIG. 3 the auxiliary oscillator output is referred to as sin B and the quadrature phase shifted output is referred to as cos B where $$B=\omega_b t/4-(\omega_C-\omega_L)t-\phi$$

The outputs cos A sin B and sin A cos B from the multipliers 70, 72 are combined in a summing amplifier 80 to produce an output sin $(A+B)$ which equals sin $[\omega_b t/4+\theta t]$.

Thus by feeding a frequency of one quarter the bit rate $(f_b/4)$ into the multipliers, the phase of the summed output from the amplifier 80 is rotated by 90° every bit period in addition to the modulation $\theta t$. In the data demodulator the data is recovered by alternately strobing the two quadrature signals. This is equivalent to observing alternately the signal and (the signal $+\pi/2$). The introduction of a 90° phase shift every bit period effectively carries out this demultiplexing operation and replaces the switches normally used for the purpose (as for example in EP Patent Specification No. 0 098 649 and corresponding U.S. Pat. No. 4,570,125).

I claim:

1. A data receiver comprising quadrature mixers having outputs coupled by signal paths to a coherent data demodulator, means for applying an incoming signal to each of said mixers, low pass filter means in each of said signal paths, and means for correcting phase errors after the outputs from the mixers have been low pass filtered in said filter means, the data demodulator including means for determining the phase error in the incoming signal and producing a control signal in response to the phase error determined;

wherein said means for correcting phase errors comprises a controllable frequency generator having an output frequency corresponding to substantially one quarter of the received bit rate of the incoming signal, said generator having an output and an input; and first and second multipliers and summing means;

said control signal is applied to the input of the controllable frequency generator, the first multiplier being coupled to the output of the first of the quadrature mixers through the respective low pass filter means, the second multiplier being coupled to the output of the second of the quadrature mixers through the respective other low pass filter means, the output of the controllable frequency generator being coupled to the first and second multipliers; and the summing means has first and second inputs coupled respectively to outputs of the first and second multipliers and an output coupled to the data demodulator.

2. A data receiver comprising quadrature mixers having outputs coupled by signal paths to a coherent data demodulator, means for applying an incoming signal to each of said mixers, low pass filter means in each of said signal paths, and means for correcting phase errors after the outputs from the mixers have been low pass filtered in said filter means, the data demodulator including means for determining the phase error in the incoming signal and producing a control signal in response to the phase error determined;

wherein said correcting means includes a controllable frequency generator having an output frequency corresponding to substantially one quarter of the received bit rate of the data in the incoming signal, said generator having an output and an input; first and second quadrature multipliers and summing means; said control signal is applied to the input of the controllable frequency generator, the first multiplier being coupled through the respective low pass filter means to the output of the first of the quadrature mixers, the second multiplier being coupled through the respective other low pass filter means to the output of the second of the quadrature mixers, and the output of the controllable frequency generator being coupled to the first and second multipliers; and the summing means has first and second inputs coupled respectively to outputs of the first and second multipliers and an output coupled to the data demodulator.

3. A data receiver as claimed in claim 2, comprising local oscillator means for generating quadrature outputs independent of the signals propagating in said signal paths and individually supplying such quadrature outputs to said quadrature mixers for mixing therein with the incoming signals, and means coupled to the data demodulator for applying a slow automatic frequency control signal to the local oscillator.

4. A data receiver as claimed in claim 2, comprising local oscillator means for generating quadrature outputs independent of the signals propagating in said signal paths and individually supplying such quadrature outputs to said quadrature mixers for mixing therein with the incoming signals, and means in the data demodulator for determining the incoming signal phase error by comparing the time of the zero crossings in the inputs thereto with the nominal times at which these crossings should occur.

5. A data receiver comprising quadrature mixers having outputs coupled by signal paths to a coherent data demodulator, means for applying an incoming signal to each of said mixers, low pass filter means in each of said signal paths, and means for correcting phase errors after the outputs from the mixers have been low pass filtered in said filter means, the data demodulator including means for determining the phase error in the incoming signal and producing a control signal in response to the phase error determined;

wherein said correcting means includes phase shifting networks in said signal paths to the data demodulator, and said receiver further comprises means for using said control signal to determine a phase correction to be applied to said phase shifting networks.

6. A data receiver as claimed in claim 5, wherein each phase shifting network has a plurality of parallel outputs, the phase being shifted by respectively different values at respective outputs; and wherein said using means includes means for selecting one of the outputs of the respective phase shifting network in response to said control signal to alter the phase of the signal being applied to the data demodulator.

* * * * *